United States Patent [19]

Huberts et al.

[11] Patent Number: 5,133,824
[45] Date of Patent: Jul. 28, 1992

[54] METHOD AND DEVICE FOR REMOVING A FLEXIBLE PRODUCT FROM A CARRIER PLATE

[75] Inventors: Petrus A. A. Huberts, Mierlo; Henricus H. B. Wouters, Valkenswaard, both of Netherlands

[73] Assignee: Philips and Du Pont Optical Company, Nieuwegin, Netherlands

[21] Appl. No.: 626,584

[22] Filed: Dec. 7, 1990

[30] Foreign Application Priority Data

Dec. 7, 1989 [NL] Netherlands ............... 8903010

[51] Int. Cl.⁵ ............................................. B32B 35/00
[52] U.S. Cl. ................................. 156/344; 156/584; 264/335; 164/131; 269/21; 279/3; 414/627
[58] Field of Search ............... 164/131; 156/584, 344; 264/107, 554, 335, 571; 279/3; 269/21; 414/627

[56] References Cited

U.S. PATENT DOCUMENTS

| | | | |
|---|---|---|---|
| 2,730,370 | 1/1956 | Brewster | 264/571 |
| 4,301,099 | 11/1981 | Broeksema et al. | 264/107 X |
| 4,381,964 | 5/1983 | Lock | 264/335 X |
| 4,449,916 | 5/1984 | Ito et al. | 264/107 X |
| 4,603,867 | 8/1986 | Babb et al. | 279/3 |

FOREIGN PATENT DOCUMENTS

| | | | |
|---|---|---|---|
| 56-78124 | 6/1981 | Japan | 269/21 |
| 60-122140 | 6/1985 | Japan | 264/107 |
| 60-127544 | 7/1985 | Japan | 264/107 |
| 61-209139 | 9/1986 | Japan | 264/107 |

Primary Examiner—Michael W. Ball
Assistant Examiner—Mark A. Osele
Attorney, Agent, or Firm—David R. Treacy

[57] ABSTRACT

A flexible product, more particularly an information-carrying disc, is removed from a carrier plate, more particularly a mold, by creating a partial vacuum at the side of the product facing away from the carrier plate. While the product is being displaced in a direction facing away from the carrier plate under the influence of the partial vacuum, the product is guided in such a way that it is displaced over the greatest distance at two opposite ends and the displacement of the parts of the product situated between these ends decreases gradually towards the center of the product.

17 Claims, 2 Drawing Sheets

METHOD AND DEVICE FOR REMOVING A FLEXIBLE PRODUCT FROM A CARRIER PLATE

BACKGROUND OF THE INVENTION

1. Field of the Invention

The invention relates to a method for removing a flexible article or product, in particular an information-carrying disc-type element from a carrier plate, in particular a mold, by creating a partial vacuum at the side of the product facing away from the carrier plate.

2. Description of the Related Art

For the production of data-carrying discs, use is commonly made of master molds, on which mother molds are made, while the mother molds are used again for the production of stamper molds, which can be used for the final production of the products.

For the production of a mother mold or stamper mold starting from a master mold or mother mold, a thin layer of material, for example a nickel layer approximately 0.3 mm thick, is generally deposited on and is thus in intimate contact with the master mold or the mother mold.

The mother or stamper mold approximately 0.3 mm thick thus obtained is a flexible disc-type element which for further use must be removed from the master or mother mold forming a carrier plate. It is, of course, of great importance here that any damage to the molds is avoided, since damage to the molds will adversely affect the quality of the end product.

SUMMARY OF THE INVENTION

The object of the invention is therefore to obtain a method for the removal of a article or product from a carrier plate in which the causing of damage will be practically ruled out.

This can be achieved according to the invention in that, while it is being displaced in a direction facing away from the substrate under the influence of the partial vacuum created, the product is guided in such a way that the product is displaced over the greatest distance at two opposite ends and the displacement of parts of the product situated between these ends in a direction away from the said ends decreases gradually towards the center of the product.

With the use of the method according to the invention, the product to be removed from the carrier plate can remain clamped on the carrier plate near its center and can be peeled or bent off gradually from the carrier plate from its ends inwards, avoiding the occurrence of a relative shift between the product of the carrier plate in a direction parallel to the initial contact face between the product and the carrier plate, so that the occurrence of damage is practically ruled out.

In this case, according to the invention, an efficient device for carrying out the method according to the invention can be obtained if the device is provided with a base on which a carrier plate can be placed and clamped by creating partial vacuum between the carrier plate and the base, and the device is also provided with a removal plate which can be positioned above the carrier plate, and of which the boundary face or surface facing the carrier plate is cylindrically curved at least over the greater part of its surface, with a center of curvature which is situated at the side of the removal plate facing away from the carrier plate, so that the boundary surface is convex. The device also means for the creation of a partial vacuum near the boundary face which is curved.

On use of the device according to the invention, the carrier plate with the flexible product thereon can be positioned between the base and the removal plate and, through the creation of a partial vacuum, the flexible product can be attracted towards the boundary face of the removal plate, for the removal of the flexible product from the carrier plate.

BRIEF DESCRIPTION OF THE DRAWINGS

The invention will be explained in greater detail below with reference to appended figures.

DETAILED DESCRIPTION OF THE PREFERRED EMBODIMENTS

Figure 1:
FIG. 1 shows schematically a cross-section through a master or mother mold with mother or stamper mold formed thereon.

FIG. 1 shows a disc-type master mold or mother mold 1 in cross-section, having a generally planar surface. A mother mold or stamper mold 2 is produced on this mold by depositing thereon, for example, a nickel layer approximately 0.3 mm thick. As can be seen from FIG. 1, during the production of the mold 2, this nickel material is also deposited around the edge of the master mold or mother mold 1, forming a projecting bead 3.

Figure 2:
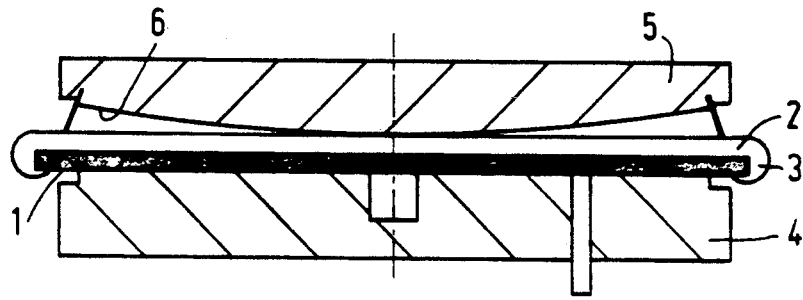
FIG. 2 shows schematically a cross-section through the two molds shown in FIG. 1, clamped between a base and a removal plate.
Figure 3:
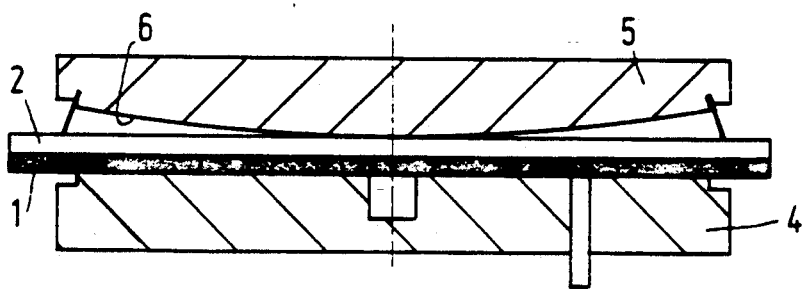
FIG. 3 shows a cross-section corresponding to that of FIG. 2, in which an edge of the mother or stamper mold extending round the master or mother mold is removed.

For the removal of the circular mold 2 from the also circular mold 1, the two molds 1 and 2 are clamped in the manner shown in FIG. 2 between a base 4 and a removal plate 5. This assembly of base 4 and removal plate 5 with the molds between them is then set in rotation, and the beaded edge 3 is removed by means of a chisel or file, so that the construction shown in FIG. 3 is then obtained.

For detaching the mold 2 from the mold 1, a partial vacuum is then created between the planar top face of the mold 2 (shown in the figures) and the boundary face 6 of the removal plate 5 facing the mold 2.

Figure 4:
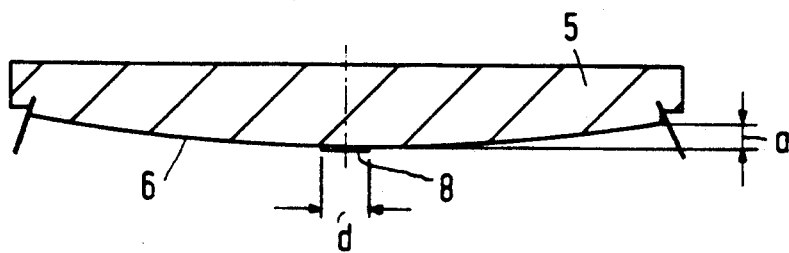
FIG. 4 shows schematically a cross-section through the removal plate.

As can be seen from the figures, the boundary face 6 is made curved, and is in fact curved about a line extending at right angles to the plane of the drawing, so that the boundary face 6 forms part of a cylindrical curved surface, of which the center of curvature is situated at the side of the boundary face 6 facing away from the base 4. It is pointed out that, for the sake of clarity, the curvature of the boundary face of the removal plate 5 is shown greatly exaggerated in FIGS. 2–4.

With usual diameters of this boundary face 6 of the order of magnitude of 20–35 cm, the greatest height distance (a) between the center of the boundary face 6 and a point situated on its periphery is approximately 0.5 mm.

Near its center the boundary face is preferably also provided with a flat, non-curved center part 8, which in the position shown in FIGS. 2 and 3 extends parallel to the flat top boundary face of the base 4, has a diameter (d) of approximately 10 mm and, as shown in the figures, projects approximately 50 microns below the adjacent part of the boundary face 6.

By means of the centrally situated center part 8, the mold 2 will be held pressed against the mold 1, while through the creation of a partial vacuum between the top face of the mold 2 and the boundary face 6 of the removal plate 5 the flexible mold 2 will be attracted, while bending in a direction away from the mold 1, towards the curved boundary face 6. During such bending of the mold 2 about the axis of the boundary face 6 extending at right angles to the plane of the drawing, any shift between the two molds 1 and 2 in the boundary face between the two molds 1 and 2 lying on each other, which shift could cause damage to the mold surfaces, is practically ruled out.

After the mold 2 is bent in this way against the boundary face 6 of the removal plate and is clamped thereon through the partial vacuum created, the removal plate 5 with the mold 2 clamped thereon can be moved upwards for complete separation of the two molds 1 and 2.

Since the center part of the mold generally is not provided with information, it is possible without the risk of damage to use the flat center part 8, by means of which a good hold on the molds 1 and 2 relative to each other can then be ensured during the bending of the mold 2 in a direction away from the mold 1.

Figure 5:
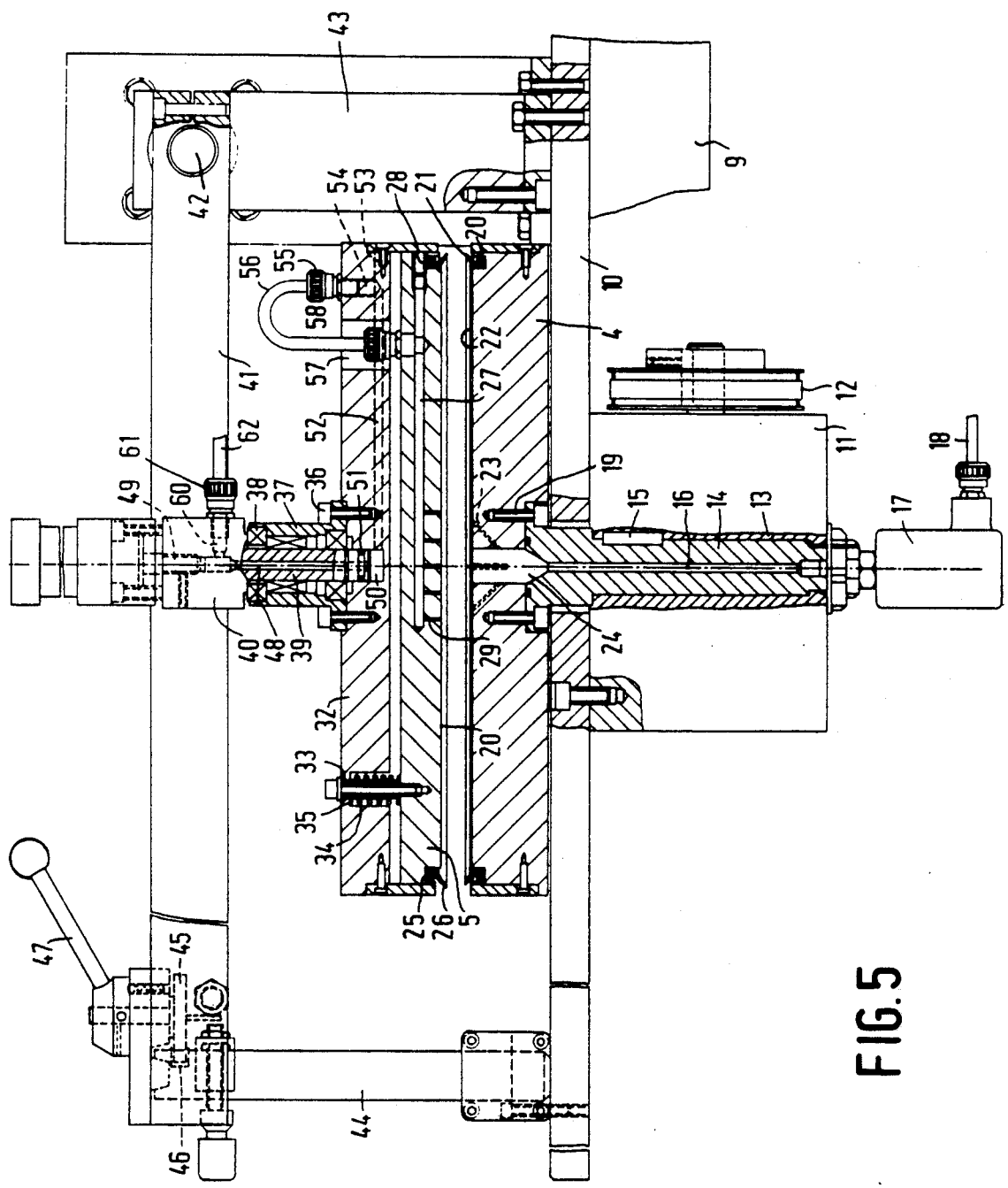
FIG. 5 shows a part of an example of an embodiment of the device according to the invention, partially in cross-section, partially an elevational view.

An expedient embodiment of a device by means of which the method described above with reference to FIGS. 1-4 can be carried out is shown in FIG. 5.

The device shown in FIG. 5 is provided with a table top 10, supported by a frame 9 which is only partially shown. A gearbox 11, which by means of a belt drive 12 can be driven by means of a motor (not shown), is fixed to the bottom side of said table top.

A vertical-standing shaft 14 is fixed by means of a key 15 in a hub-shaped element 13 which is mounted in the gearbox 11 and can be set in rotation, and which forms part of a gear wheel (not shown).

The shaft 14 is provided with a bore 16 extending in the lengthwise direction of the shaft 14. A coupling element 17, which connects the bore 16 to a pipe 18 connected to the coupling element, is connected to the bottom end of the shaft 14, while the shaft 14 can be rotated relative to the coupling element 17 which has a fixed position in the device.

The base 4 is fixed by means of bolts 19 at the top end of the shaft 14. Near its periphery, the base is provided at its top side with an annular groove in which a sealing ring 20 with a lip 21 extending upwards and outwards is disposed.

Provided in the top face of the base 4 are grooves 22 which via bores 23 provided in the base are connected to a hole 24 provided centrally in the base, and to which the bore 16 provided in the shaft 14 is connected.

A cushion element (not shown) of resilient material, of the type described in EP-A-0, 298,564, is disposed on the top side of the base 4.

Placed above the base 4 is the removal plate 5 which at its periphery is also provided with an annular groove accommodating a sealing ring 25 which is provided with a sealing lip 26 running downwards and outwards.

The removal plate 5 contains a radially extending blind bore 27 which is shut off by a plug 28 at one end. The bore 27 is connected by means of a number of bores 29 extending at right angles to the bore to grooves 30 provided in the bottom surface of the removal plate.

The removal plate is also provided at its bottom side with a cushion element (not shown) of the type described in EP-0, 298, 564.

The removal plate is suspended by means of a number of bolts 31 from a supporting plate 32 extending above the removal plate. As can be seen from FIG. 5, the bolts 31 in this case rest with their heads on the top side of the supporting plate 32, while the bolts are screwed into threaded holes in the removal plate. The bolts 31 are surrounded by bushings 33 which are slidable in the vertical direction in the supporting plate 32, and which extend between the top side of the removal plate 5 and the bottom side of the heads of the bolts. The bushings 33 are surrounded by compression springs 34, which lie confined between the top side of the removal plate 5 and collars 35 formed in the supporting plate 32 at the level of the transition between two parts, of different diameters, of bores provided in the plate 32 through which the bolts 31 extend.

The supporting plate 32 is fixed by means of bolts 36 to a hub-shaped element 37 placed on top of the supporting plate. The hub-shaped element 37 is rotatably mounted by means of bearings 38 on a vertical-running shaft 39. The shaft 39 is connected to a housing 40 which is fixed to an arm 41 extending on either side of the housing 40.

The arm 41 is swivellably fixed by means of a horizontal-running shaft 42 to a support 43 fixed on the table top 10.

In the position shown in FIG. 5 the arm 41 extends at least almost horizontally, while the ends of the arm 41 facing away from the support 43 rest on a support 44 also fixed to the table 10. This end of the support is in this case fixed by means of an eccentric disc 45, which in the position shown in FIG. 5 extends partially into a notch 46 provided in the support 44. The eccentric disc 45 is rotatable from the position shown in FIG. 5 into a position in which the eccentric disc 45 no longer engages with the notch 46, by means of an operating handle 47 fixed on the eccentric disc 45.

A bore 48, extending in the lengthwise direction of the shaft 39, is provided in the shaft 39, said bore being closed off at its top end by a plug 49 screwed into the housing 40. The open bottom end of the bore 48 opens out into a blind hole 50 which is provided in the supporting plate 32, and in which the bottom end of the shaft 39 is accommodated. A circular groove containing a sealing packing 51 is fitted in this bottom end of the shaft 39.

A radially running bore 52 fitted in the supporting plate 32 extends from the outer periphery of the supporting plate 32 into the bore 50. The end of the bore 52 lying near the outer periphery of the plate 32 is shut off by means of a plug 53 screwed into the supporting plate.

The plate 32 also has provided in it a threaded bore 54 extending at right angles to the bore 52, and to which flexible pipe 56 is connected by means of a connecting nipple 55. The pipe 56 extends through a hole 57 provided in the plate 32. The end of the pipe 56 lying in the hole 57 is here fixed by means of a nipple 58 in a threaded hole 59 which is provided in the plate 5 and is in open communication with the bore 27 disposed in the plate 5. It will be clear that in this way the two bores 27 and 52 are brought into open communication with each other by means of the pipe 56.

The housing 40 also contains a threaded bore 60 which extends at right angles to the bore 48 and is connected to said bore, and to which a pipe 62 is connected by means of a nipple 61.

The pipes 18 and 62 can be connected if desired to a vacuum source, so that a partial vacuum can be created both in the grooves 22 provided in the base 4 and in the grooves 30 provided in the removal plate 5.

As is explained in EP-A-0,298,564, this partial vacuum will spread between the projecting parts of the cushion element made of deformable material which is placed on the top side of the base 4 or on the bottom side of the removal plate 5.

In the position of the device shown, two molds lying on each other, as shown in FIG. 1, are clamped between the base 4 and the removal plate 5, as explained above with reference to FIGS. 1–4. The lips 21 and 26 of the seals 20 and 25 in this case rest against the bottom side of the mold 1 and the top side of the mold 2 respectively, and the mold 1 can be clamped in an effective manner against the base 4 for the creation of a partial vacuum in the bore 16 in the shaft 14 and in the grooves 32 in the base 4 connected to this bore and the cushion element (not shown) placed thereon.

A partial vacuum acting on the top side of the mold 2 for removing the mold 2 from the mold 1 can be created in a similar manner in the grooves 30 and the cushion element (not shown) fitted on the bottom side of the removal plate 5.

After the mold 2 has been stuck to the bottom face of the removal plate 5 in this way, and after rotation of the eccentric disc 45 by means of lever 47 in such a way that this eccentric disc has become released from the notch 46, the arm 41 with the removal plate 5 carried by the grm 41 and the mold 2 adhering thereto can be swung clockwise about the shaft 42, as shown in FIG. 5, so that complete separation of the molds 1 and 2 is then achieved. On removal of the vacuum in the grooves 30, the mold 2 can then be removed from the removal plate and the mold 1 from the base plate. A new assembly of molds 1 and 2 can then be placed on the base 4 and the arm 41 with the removal plate connected thereto can be swung back into the position shown in FIG. 5.

Through the resilient support of the removal plate by means of the bolts 31 and the springs 34, the removal plate 5 can swing out here in the vertical direction, so that good confinement of the two molds 1 and 2 between the base 4 and the removal plate will always be guaranteed.

Although the main use of the method and the device according to the invention in the production of molds intended for the production of video and/or audio discs has been discussed above, it will be clear that the method according to the invention can also be used for the removal of other flexible products instead of molds 2 from carrier plates, which can be formed by objects other than the molds 1.

We claim:

1. A method of removing a flexible article from a carrier plate having an article-contacting surface having a given surface shape, said article having a center and being in intimate contact with said article-contacting surface, comprising the steps of:
   providing a removal plate having a boundary surface having a central zone, said boundary surface having a surface shape relative to said given surface shape such that, when the central zone is contacted against said article, said boundary surface curves relatively away from said article in each of two opposite directions from said central zone towards opposite ends of said article,
   holding said removal plate against said article with said central zone contacting said article,
   creating a partial vacuum between said boundary surface and said article, thereby causing said article to be displaced from said article-contacting surface towards said boundary surface, displacement of parts of the article situated between said ends progressing sequentially from said ends towards the center of the article and decreasing gradually from said ends towards the center of the article, and
   moving said removal plate and said carrier plate relatively away from each other in a direction generally perpendicular to said central zone.

2. A method as claimed in claim 1, characterized in that at least one of said surfaces is a generally planar surface and the other of said surfaces is a cylindrical surface having an axis parallel to said planar surface.

3. A method as claimed in claim 1, characterized in that said removal plate includes a sealing ring arranged at a periphery of the plate, having a lip extending outwardly and towards said article.

4. A method of removing a flexible article from a carrier plate having an article-contacting surface, said article being in intimate contact with said article-contacting surface, and said article having a center and a generally planar surface at a side remote from said article-contacting surface, comprising the steps of:
   providing a removal plate having a convex cylindrical boundary surface having a central zone,
   holding said removal plate against said article with said central zone contacting said center of said article, whereby said boundary surface curves relatively away from said article in each of two opposite directions from said central zone towards opposite ends of said article,
   creating a partial vacuum between said boundary surface and said article, thereby causing said article to be displaced from said article-contacting surface towards said boundary surface, displacement of parts of the article situated between said ends progressing sequentially from said ends towards the center of the article and decreasing gradually from said ends towards the center of the article, and
   moving said removal plate and said carrier plate relatively away from each other in a direction generally perpendicular to said central zone.

5. A method as claimed in claim 4, characterized in that said boundary surface has a part of said central zone projecting beyond adjacent parts of the boundary surface.

6. A method as claimed in claim 4, characterized in that said removal plate includes a sealing ring arranged at a periphery of the plate, having a lip extending outwardly and towards said article.

7. A method as claimed in claim 4, characterized in that said flexible article is an information-carrying disc element.

8. A method as claimed in claim 4, characterized in that said carrier plate is a mold.

9. A device for removing a flexible article from a carrier plate, said article having a center and a generally planar surface remote from said carrier plate, comprising means for holding said carrier plate, and means including a vacuum source for moving said article out of contact with said plate, characterized in that said means for moving comprises:

a removal plate having a convex cylindrical boundary surface having a central zone, means for holding said removal plate against said article with said central zone contacting said center of said article surface, whereby said boundary surface curves relatively away from said article in each of two opposite directions from said central zone towards opposite ends of said article, means including said vacuum source for creating a partial vacuum between said boundary surface and said article, thereby causing said article to be displaced from said carrier plate towards said boundary surface sequentially from said ends towards the center of the article and, with displacement of parts of the article situated between said ends decreasing gradually from said ends towards the center of the article, and means for moving said removal plate and said carrier plate relatively away from each other in a direction generally perpendicular to said central zone.

10. A device as claimed in claim 9, characterized in that said boundary surface has a part of said central zone projecting beyond adjacent parts of the boundary surface.

11. A device as claimed in claim 9, characterized in that said boundary face has an outer periphery with a diameter of approximately 20 to 35 mm, and the greatest height difference by which the boundary face curves away from said article while the removal plate is in contact with the article center is approximately 0.5 mm.

12. A device as claimed in claim 11, characterized in that said part of said central zone is a flat level part having a diameter of approximately 10 mm.

13. A device as claimed in claim 12, characterized in that said flat level part projects approximately 50 microns beyond adjacent parts of the boundary face.

14. A device as claimed in claim 13, characterized in that said carrier plate is a mold and said flexible article is an information-carrying disc-type element.

15. A device as claimed in claim 14, characterized in that said removal plate includes a sealing ring arranged at a periphery of the plate, having a lip extending outwardly and towards said article.

16. A device as claimed in claim 15, characterized in that said removal plate has an axis aligned with said center of said article, and the device further comprises means for mounting said removal plate for free rotation about its axis.

17. A device as claimed in claim 9, characterized in that said removal plate includes a sealing ring arranged at a periphery of the plate, having a lip extending outwardly and towards said article.

* * * * *